(12) United States Patent
Schneider et al.

(10) Patent No.: US 8,273,454 B2
(45) Date of Patent: Sep. 25, 2012

(54) EPOXY RESIN IMPREGNATED YARN AND THE USE THEREOF FOR PRODUCING A PREFORM

(75) Inventors: Markus Schneider, Dusseldorf (DE); Bernd Wohlmann, Dusseldorf (DE)

(73) Assignee: Toho Tenax Europe GmbH, Wuppertal (DE)

( * ) Notice: Subject to any disclaimer, the term of this patent is extended or adjusted under 35 U.S.C. 154(b) by 635 days.

(21) Appl. No.: 11/547,008

(22) PCT Filed: Mar. 29, 2005

(86) PCT No.: PCT/EP2005/003281
§ 371 (c)(1),
(2), (4) Date: Oct. 2, 2006

(87) PCT Pub. No.: WO2005/095080
PCT Pub. Date: Oct. 13, 2005

(65) Prior Publication Data
US 2007/0196636 A1     Aug. 23, 2007

(30) Foreign Application Priority Data
Mar. 31, 2004   (EP) .................................... 04007749

(51) Int. Cl.
*D02G 3/36*  (2006.01)
*B05D 3/02*  (2006.01)
(52) U.S. Cl. ........ 428/364; 428/375; 428/378; 428/367; 428/299.1; 428/300.1; 427/374.1; 427/384
(58) Field of Classification Search .................. None
See application file for complete search history.

(56) References Cited

U.S. PATENT DOCUMENTS

| | | | |
|---|---|---|---|
| 3,676,200 A | 7/1972 | Rembold et al. | |
| 4,167,538 A | 9/1979 | Taniguchi et al. | |
| 4,219,457 A | 8/1980 | Taniguchi et al. | |
| 4,420,512 A * | 12/1983 | Ogawa et al. | 427/386 |
| 5,140,071 A | 8/1992 | Kroker et al. | |
| 5,178,706 A * | 1/1993 | Nishibara et al. | 156/229 |
| 5,227,238 A * | 7/1993 | Hirai et al. | 428/369 |
| 5,726,216 A * | 3/1998 | Janke et al. | 522/31 |
| 6,228,474 B1 | 5/2001 | Kishi et al. | |
| 6,399,199 B1 * | 6/2002 | Fujino et al. | 428/396 |
| 6,500,878 B1 | 12/2002 | Reich et al. | |
| 2005/0271874 A1 * | 12/2005 | Sakajiri et al. | 428/364 |

FOREIGN PATENT DOCUMENTS

| | | |
|---|---|---|
| DE | 20 33 626 A | 1/1971 |
| DE | 27 46 640 A | 4/1978 |
| DE | 39 42 858 A | 6/1991 |
| DE | 199 33 741 A1 | 1/2001 |
| DE | 201 20 447 U1 | 4/2002 |
| EP | 1500740 A1 * | 1/2005 |
| JP | 09250087 A * | 9/1997 |
| JP | 2002-317383 A | 10/2002 |
| JP | 2003-003376 A | 1/2003 |
| JP | 2004149721 A * | 5/2004 |
| JP | 2004169260 A * | 6/2004 |
| JP | 2005290614 * | 10/2005 |
| WO | WO 98/30374 A | 7/1998 |
| WO | WO 2004040055 A1 * | 5/2004 |

OTHER PUBLICATIONS

EPIKOTE 1001 Product Data Sheet; Sep. 2002.*
EPIKOTE 1007 Product Data Sheet; Jun. 2004.*
EPIKOTE 828 Product Data Sheet Jul. 2001.*
EPIKOTE 1002, Product Data Sheet Sep. 2002.*
Pub Chem Databse compound; EPIKOTE 828, Aug. 2005.*
JP 09-250087A, machine translation, Sep. 1997.*
JP 2004-169260, machine translation, Jun. 2004.*
HEXION Product Bulletin (2009).*
Partial Translation, "Plastic Functional Polymer Material Dictionary", Industrial Research Center of Japan, $1^{st}$ Edition, $1^{st}$ copy, Feb. 20, 2003.
Partial Translation, Taisuke Okita, "Ethylene-Propylene Rubbers", Synthetic Rubber Processing Technique Encyclopedia, vol. 7, pp. 78-91, Jul. 10, 1972.
Notification of Reasons for Refusal for Japanese Patent Application No. 2007-505485, mailed Oct. 27, 2010.

* cited by examiner

*Primary Examiner* — Jill Gray
(74) *Attorney, Agent, or Firm* — Oliff & Berridge, PLC

(57) ABSTRACT

A yarn includes reinforcing fiber filaments and a resin that is infiltrated into the yarn and can be repeatedly melted and solidified by cooling to room temperature, wherein the filaments of the yarn are at least partially bound to one another by the resin, wherein the yarn contains 2.5 to 25 wt.% of infiltrated resin relative to its total weight, and wherein the infiltrated resin includes a mixture of at least two epoxy resins E1 and E2, E1 having an epoxy value in the range of 2,000 to 2,300 mmol/kg of resin and E2 having an epoxy value in the range of 500 to 650 mmol/kg of resin, and the weight ratio E1:E2 of the epoxy resins E1 and E2 in the mixture is chosen so that the infiltrated resin mixture has an epoxy value between 550 and 2,100 mmol/kg of resin. A preform comprising the yarn, a method for producing the preform and its use in producing a composite are also described.

12 Claims, No Drawings

EPOXY RESIN IMPREGNATED YARN AND THE USE THEREOF FOR PRODUCING A PREFORM

CROSS-REFERENCE TO RELATED APPLICATION

This application is a U.S. national stage application of PCT/EP2005/003281, filed Mar. 29, 2005, which PCT application is incorporated herein by reference in its entirety.

BACKGROUND

The present invention relates to a yarn, the use of the yarn to produce a preform, a preform comprising the yarn, a method for production of the preform, and its use in the production of a composite.

A known method of producing fiber-reinforced plastic components consists in first preparing a preform similar in form to the component, transferring the preform to a tool having the form of the component, and finally producing the desired component by addition of a matrix resin.

In contrast to preforms, prepregs (preimpregnated fibers) already contain both components (fibers and matrix resin) in the same ratio as in the final mixture, and are therefore resistant to bending, even in the form of the semi-finished product. To prevent premature unwanted reactions, this material must also be stored cool and even then has only a limited shelf life. On account of the material's flexural rigidity and its production in the form of large-width rolls, the use of prepregs is restricted to components of large surface area that are nearly planar. The presence of the matrix resin does not permit textile processing or wrinkle-free application of prepregs around narrow radii or on strongly contoured geometries, for example.

If flexible yarns are used for the production of preforms, it is possible to produce surfaces that are far more heavily curved. Moreover, the maximum shelf life of the preform is significantly improved as compared with prepregs, because the matrix resin is not added until the production of the composite material.

JP 2003 003376 A describes a carbon fiber bundle for production of a prepreg. The bundle comprises 20,000 to 100,000 filaments and is held together by a sizing agent containing polyoxyalkylene groups and epoxy groups. The carbon fiber bundle contains 0.5 to 3 wt.% of sizing agent relative to its total weight.

DE 27 46 640 A describes a carbon-fiber reinforced material on which a resin mixture containing an epoxy resin, a condensation product of an acid component and a hydroxyl component, and an oxyalkylene derivative of a phenol has been applied. The carbon fibers contain 0.01 to 10 wt.% of resin mixture relative to their total weight.

DE 39 42 858 A describes a sizing agent for carbon fibers that contains an epoxy resin and a nonionic emulsifier containing tertiary amino groups, at least one functional group capable of reacting with the epoxy resin, and at least one group with emulsifying action. 0.3 to 10 wt.% of sizing agent is said to be present on the fiber.

DE 20 33 626 A describes a method for production of a prepreg from mechanically high-grade fiber materials such as, in particular, fibers of glass, boron or carbon. The fibers are impregnated with a solution containing a curable polyadduct that contains free glycidyl groups and consists of triglycidyl isocyanurate, a curing agent and an organic solvent.

DE 201 20 447 U1 describes a preform consisting of a textile flat structure, such as a fabric or fiberwoven fabric layer, with a thermoplastic, non-crosslinked binder, which can be, for example, an epoxide, adhering to the surface of the textile flat structure. According to DE 201 20 447 U1, the binder is applied by, for example, spraying a binder solution on to the surface of the textile flat structure, whereby the binder solution contains powder particles that are uniformly dispersed in a solvent, and whereby the powder particles can consist exclusively of epoxy resin.

However, when a preform is produced from a textile flat structure, the binder coating is unevenly distributed over the thickness of the textile flat structure, and in some places, particularly where the yarns are in contact with one another, is almost absent. A preform of this type therefore often has low slip resistance, so that further handling of the preform is difficult or even impossible.

Additional disadvantages arise if the preform is to have perforations, which, if the preform is produced from textile flat structures, must in many cases be produced by cutting out material. This requires additional processing time, and the offcuts result in considerable loss of material and generate a corresponding amount of waste. This method for producing a preform is therefore cost- and labor-intensive, which is reflected in the costs of the composites produced from it.

SUMMARY

An object of the present invention is therefore to at least reduce the disadvantages described above.

This and other objects of the invention are achieved by a yarn comprised of reinforcing fiber filaments and a resin, infiltrated into the yarn, that can be repeatedly melted and solidified by cooling to room temperature, whereby the filaments of the yarn are at least partially bound to one another by the resin, whereby the yarn contains 2.5 to 25 wt.% of infiltrated resin relative to its total weight, and whereby the infiltrated resin is comprised of a mixture of at least two epoxy resins E1 and E2, E1 having an epoxy value in the range of 2,000 to 2,300 mmol/kg of resin and E2 having an epoxy value in the range of 500 to 650 mmol/kg of resin, the weight ratio E1:E2 of the epoxy resins E1 and E2 in the mixture being so chosen that the infiltrated resin mixture has an epoxy value between 550 and 2,100 mmol/kg of resin.

Because the filaments of the yarn are at least partially bound by the resin, the yarn of the invention has extremely good compactness.

DETAILED DESCRIPTION

In the yarns of the invention, the resin should be chosen so that the yarn coated with it is not tacky at room temperature. In general, therefore, a yarn of this type can not only be wound up, but can also be stored in the wound-up state with maintenance of its textile properties and unwound again even after long periods of storage. For example, the yarn of the invention can be unwound without any problem after 12 months of storage, and then shows values of strength, elastic modulus and elongation at break, as measured by the methods of DIN 65 382, that have changed only marginally, if at all.

Finally, the yarn of the invention can be used to produce a preform without the need for complicated addition of further binder material, whereby, however, the binding between the yarns is better than in a state-of-the-art preform. Moreover, in contrast to state-of-the-art production of the initially described preform with perforations, no wastage of yarn occurs. The need to dispose of yarn offcuts therefore does not arise.

In a preferred embodiment, the yarn of the invention contains 3 to 10 wt.% of infiltrated resin relative to its total weight.

In another preferred embodiment of the invention, the reinforcing fiber filaments of the yarn of the invention are carbon fiber filaments that have been obtained from precursors of pitch, polyacrylonitrile or viscose, or aramid filaments, glass filaments, ceramic filaments, boron filaments, synthetic fiber filaments or natural fiber filaments, or a combination of one or more of these filaments.

The object is further achieved by a yarn comprised of reinforcing fiber filaments and a resin that is infiltrated into the yarn and can be repeatedly melted and solidified by cooling to room temperature, whereby the filaments of the yarn are at least partially bound to one another by the resin, whereby the yarn contains 2.5 to 25 wt.% of infiltrated resin relative to its total weight, whereby the reinforcing fiber filaments are electrochemically pretreated carbon filaments, whereby the infiltrated resin contains at least two bisphenol A epichlorohydrin resins H1 and H2 in the weight ratio H1:H2 of 1.1 to 1.4, H1 having an epoxy value of 1,850 to 2,400 mmol/kg and a molecular weight of 800 to 1000 g/mol and being solid at room temperature, and H2 having an epoxy value of 5,000 to 5,600 mmol/kg and a molecular weight of <700 g/mol and being liquid at room temperature, and whereby the infiltrated resin contains in addition a third resin H3, H3 being a bisphenol A epichlorohydrin epoxy resin with an epoxy value of 450 to 650 mmol/kg, and a melting range of 110 to 130° C.

In a preferred embodiment, the yarn of the invention contains 3 to 10 wt.% of infiltrated resin relative to its total weight.

In another preferred embodiment, the reinforcing fiber filaments of the yarn of the invention are carbon fiber filaments that have been obtained from precursors of pitch, polyacrylonitrile or viscose, or aramid filaments, glass filaments, ceramic filaments, boron filaments, synthetic fiber filaments or natural fiber filaments, or a combination of one or more of these filaments.

The reinforcing fiber filaments are preferably carbon fiber filaments.

In regard to yarns made of carbon fiber filaments, a yarn pretreated by electrochemical oxidation is particularly appropriate. This yarn can comprise several thousand, preferably of about 3,000 to 24,000, filaments, and especially preferably of 3,000 to 12,000 filaments.

For infiltration of the resin into the yarn, any technique is appropriate in principle that supports rapid and complete wetting of the reinforcing fiber filaments of the yarn by the resin. Methods of this type are described in, for example, EP 1 281 498 A. For example, the yarn can be sprayed with a resin dispersion. Alternatively, a film of the resin dispersion can be applied to a smooth roller or in the grooves of a roller, and the yarn drawn over the smooth roller or through the grooves of the roller. The yarn is preferably conducted through a bath containing the resin dispersion.

For the resin dispersion mentioned above, any liquid mixture that forms a stable dispersion with the resins used in the invention is in principle suitable as the liquid phase. The liquid mixtures that are particularly suitable from the viewpoint of emission protection are those that are aqueous and have a low VOC (volatile organic content). For example, a mixture of water and an alcohol such as 2-propoxyethanol has proved advantageous for the bisphenol A epichlorohydrin epoxy resin that is preferred in the method of the invention.

In a particularly preferred embodiment, the yarn of the invention contains a total of 0.5 to 1.7 wt.% of H1 and H2, and 2.0 to 4.3 wt.%, respectively 2.3 to 5.5 wt.% of H3, relative to its total weight.

The production of the yarn of the invention can be integrated into the production process of the yarn to be infiltrated with resin after the yarn has been dried and before it is wound up, whereby the dried yarn can be infiltrated with the at least one resin either individually or in the form of a warp sheet, whereby, if a resin dispersion is used for the infiltration, a yarn tension of 0.25 to 1.3 cN/tex allows good wetting of the reinforcing fiber filaments.

The quantity of the infiltrated resin, i.e. 2.5 to 25 wt.% relative to the total weight of the yarn, required to be applied for the invention can of course be arrived at by adjusting the speed at which the yarn is, for example, conveyed through a bath containing the dispersion of one or more of the resins described above, the immersion length, and the resin concentration in the bath. The speed at which the yarn is conveyed through the bath lies preferably in the range of 120 to 550 m/h, and especially preferably in the range of 150 to 250 m/h. The immersion length lies preferably in the range of 0.2 to 1 m. The resin concentration in the dispersion relative to the dispersion weight lies preferably in the range of 2 to 35 wt.%, and especially preferably in the range of 2 to 7 wt.%.

A drying temperature in the range of 140 to 330° C. has proved particularly suitable for drying of the yarn coated with the resin dispersion described above.

The yarns of the invention can advantageously be used to produce a preform.

The object of the present invention is further achieved by a preform comprising the yarns of the invention as described above, whereby the yarns are bound to one another by the infiltrated resin at points of mutual contact.

Although the yarns of the invention also allow production of fabrics that yield, after melting and resolidification of the infiltrated resin, a preform that is slip resistant to a particularly high degree, it is advantageous to produce the preform of the invention from the yarns of the invention because in doing so the yarns can be positioned in the direction in which mechanical stresses are expected to be highest during the use of a composite produced from the preform of the invention.

For example, in a preferred embodiment of the preform of the invention, the yarns are positioned unidirectionally, so that the preform can be further processed into a composite, during the use of which the mechanical load is expected to be highest in exactly this direction of the yarns.

In a further preferred embodiment of the preform of the invention, the yarns are positioned bi-, tri- or multidirectionally, so that the preform can be further processed into a composite, during the use of which the mechanical load is expected to be highest in exactly these two or more directions of the yarns.

In addition to the above mentioned flat embodiments of the preform of the invention, the uni-, bi-, tri- or multidirectionally positioned yarns can be wound around a body having, for example, a cylindrical form, so that a three-dimensional preform results.

Moreover, an embodiment of the preform of the invention is preferred in which the yarns are present as short yarns that can be oriented in all spatial directions. This preform is therefore particularly suitable for production of a composite in the use of which mechanical stresses can arise in all spatial directions.

The object of the present invention is further achieved by a method for producing a preform comprising the following steps:

a) provision of one of the yarns of the invention, b) positioning of the yarn in a configuration corresponding to the configuration of the desired preform, c) heating of the configuration resulting from step b) to a temperature above the melting temperature of the resin infiltrated in the yarn, and d) cooling of the configuration resulting from step c) to at least below the melting temperature of the resin.

In a preferred embodiment of the method of the invention, the configuration resulting from step b) is compacted simultaneously with the heating in step c).

The preform of the invention, or produced by the method of the invention, shows high slip resistance because the yarns of the preform of the invention are bound to one another by the infiltrated resin. The preform of the invention is therefore easily handled, which is advantageous particularly in its subsequent processing to a composite.

If the preform of the invention, or produced by the method of the invention, is to have perforations, these can be realized by appropriate positioning of the yarns, that is, without any loss of material arising from offcuts. The cost- and labor-intensive tailoring described above for the state of the art is thereby unnecessary, and thus no waste is produced. The production of a composite with perforations is therefore easier and more economical.

Furthermore, in the production of the preform of the invention, or the preform produced by the method of the invention, the use of one of the yarns of the invention instead of a textile flat structure allows the yarn to be positioned in the direction in which mechanical stresses are expected to be highest during the use of the subsequently produced composite.

For example, in a preferred embodiment of the method of the invention for producing a preform, yarns of the invention are unidirectionally positioned in step b), so that following step d) a preform of the invention results in which the yarns are unidirectionally positioned.

In a further preferred embodiment of the method of the invention for production of the preform of the invention, the yarns of the invention can be positioned in step b) in bi-, tri- or multidirectional layers in a configuration corresponding to the configuration of the desired preform. The yarns of the invention can be used exclusively for this purpose. Alternatively, only some of the yarns within a layer may be yarns of the invention, the remainder consisting of yarns whose filaments have no resin coating. The yarns configured as described are heated in step c) of the method of the invention to a temperature above the melting temperature of the resin with which the yarns are infiltrated, with simultaneous compaction of the yarns if required. This makes the yarns tacky. After cooling in step d) to at least below the melting temperature of the resin, a preform of the invention results in which the yarns are positioned bi-, tri- or multidirectionally.

In a further embodiment of the method for production of the preform of the invention, the yarns of the invention are cut into short pieces of length, for example, 1 to 1,000 mm, and preferably 1 to 40 mm, and the short pieces of yarn are placed in a mould in step b). In step c) of the method of the invention, the short pieces of yarn are then heated to a temperature above the melting temperature of the resin with which the yarns are infiltrated, making the short yarn pieces tacky, with simultaneous compaction of the yarns if required. After cooling to at least below the melting temperature of the resin in step d), a preform of the invention results wherein the yarns of the invention are present as short yarns with isotropic orientation.

The preform of the invention, or produced by the method of the invention, or resulting from the use of the invention, can be used advantageously, for the reasons described above, to produce a composite comprising a matrix selected from one of the groups of polymers, metals, ceramics, hydraulically setting materials, and carbon, whereby thermoplastics such as polyethylene imine, polyetherketone, polyetheretherketone, polyphenylene sulfide, polyethersulfone, polyetherethersulfone and polysulfone or duromers such as epoxides are suitable as the polymer matrix; steel (alloys) or titanium, for example, as the metal matrix; silicon carbide or boron nitride, for example, as the ceramic matrix; mortar or concrete as the hydraulically setting materials; and, for example, graphite as the carbon matrix.

In the composites resulting from the uses of the invention, the yarns of the invention are positioned in the direction in which the highest mechanical stresses are expected during use of the composites. The use in accordance with the invention of the yarns of the invention and of the preforms produced from these therefore lead to composites in which the orientation of the yarns is tailored to the mechanical stresses expected.

Analytical Methods

The epoxy value of the epoxy resins used in the method of the invention is determined in accordance with DIN 53188 of October 1975.

The tensile strength and tensile modulus of the composite reinforced with a preform of the invention are measured as in EN 2561-B.

The invention will now be described in more detail with the help of the following examples.

EXAMPLE 1

Production of a Coated Yarn

A yarn of carbon fiber filaments with a yarn count of 400 tex is conducted in the dry state at the rate of 240 m/h and with a yarn tension of 340 cN through a first bath of temperature about 20° C. The bath contains an aqueous dispersion containing two bisphenol A epichlorohydrin epoxy resins H1 and H2. The weight ratio of H1 and H2 is 1.2. H1 has an epoxy value of about 2,200 mmol/kg and a molecular weight of 900 g/mol, and is solid at room temperature. H2 has an epoxy value of 5,400 mmol/kg and a molecular weight of <700 g/mol, and is liquid at room temperature. The concentration of H1 in the dispersion is 8.4 wt.%. The concentration of H2 in the dispersion is 6.9 wt.%. The residence time of the yarn in the dispersion is 12 seconds. The yarn infiltrated with H1 and H2 is, dried at a temperature falling from 250 to 140° C., and after drying contains 1.2 to 1.4 wt.% of H1 and H2 relative to its total weight.

The yarn infiltrated with H1 and H2 is conveyed directly afterwards through a second bath containing a dispersion of a bisphenol A epichlorohydrin epoxy resin with a melting temperature range of 120 to 130° C., and an epoxy value of 515 mmol/kg. The dispersion medium consists of a mixture of 76 wt.% water and 24 wt.% 2-propoxyethanol. The concentration of the epoxy resin in the bath is 4 wt.%. The residence time of the yarn in the second bath is a few seconds. On leaving the bath, the yarn, now infiltrated also with H3, is dried by passing it firstly through a vertically positioned drier at 300° C. and then through a horizontally positioned drier at 330°. The resulting yarn contains 4.3 wt.% of infiltrated resin H1+H2+H3, whereby the infiltrated resin has an epoxy value of 1,300 mmol/kg.

EXAMPLE 2

Production of a Preform

The coated yarn of Example 1 is wound onto a metal plate, each of whose surfaces (of dimensions 280 mm×300 mm) is covered with a release film, by means of a laboratory winder (with yarn speed 23.1 mm/s and yarn traction force 400 cN), the winding being carried out in each case up to the edge of the metal plate. A wound layer (with fiber mass per unit area of 267 g/m$^2$) oriented at 90° to the winding axis is first produced on both sides of the metal plate. The metal plate is then rotated through 90° in such a way that the existing wound layer lies parallel to the winding axis. In the next step, a further wound layer oriented at 90° to the winding axis is superposed on the existing wound layer, using identical winding conditions. In this way a layered structure with yarn orientations of 0° and 90° respectively results on both sides of the metal plate. The winding procedure described above is repeated until four wound layers, with yarn orientation alternating between 0° and 90°, lie superposed on each side of the metal plate.

Each of the wound layers on the two sides of the metal plate is then covered with a release film. The metal plate, complete with the two four-layer windings and the release films, is then tempered in a press for 1 hour at a surface pressure of 2 bar and a temperature of 125° C.

The resulting pressing is allowed to cool to below the melting temperature of the resin. The two wound packages are then cut apart at the end surfaces of the metal plate and the four release films removed. This results in two dimensionally stable preforms, each with a four-layer alternating 0° and 90° structure, i.e., with a bidirectional positioning of the yarns.

EXAMPLE 3

Production of a Composite

The preform produced in Example 2 is cut to a size of 200×200 mm and processed in the usual way into a composite with a 4-layer alternating 0° and 90° yarn structure, using RTM6 resin from the company Hexcel that has previously been heated to 80° C. and is applied in such a quantity that a composite with a fiber volume content of 60% can result. The composite is identical in form to the preform used.

EXAMPLE 4

Production of a Preform with Biaxial Positioning of the Yarns

Together with a standard carbon fiber filament yarn available under the name Tenax HTA 5131 400tex f6000 t0 from Tenax Fibers GmbH, Germany, the yarn produced in Example 1 is fed to a biaxial layering process, whereby every fourth parallel yarn is one from Example 1.

The biaxial arrangement has the following configuration:
In the first layer, the standard carbon fiber filament yarns and the yarns of Example 1 are at an angle of 45° to the direction of production.
In the second layer, lying immediately above the first layer, the standard carbon fiber filament yarns and the yarns from Example 1 are at an angle of minus 45° to the direction of production.
The resulting configuration is heated to 125° C. by bringing it into contact for 2 minutes with a hot calender heated to 145° C., and is then cooled to room temperature, so that a bonded textile flat structure results (preform in state A). A composite produced from this as in Example 3 with a fiber volume content of 60% has a tensile strength of 1100 MPa and a tensile modulus of 70.5 Gpa, both measured in the main direction of the fibers.

EXAMPLE 5

Production of a Preform with Three-Dimensional Positioning of the Yarns

The state A preform produced in Example 4 is molded, by means of a spherically shaped tool in the form of a hemisphere of diameter 150 mm and consisting of male and female molds, in a press for one hour with a surface pressure of 2 bar and a tool temperature of 125° C., into a geometry corresponding to that of the tool. After being cooled to room temperature, the resulting preform is hemispherical in shape.

The invention claimed is:

1. Yarn comprised of reinforcing fiber filaments and a resin, infiltrated into the yarn, that is capable of being repeatedly melted and solidified by cooling to room temperature,
   wherein the reinforcing fiber filaments of the yarn are at least partially bound to one another by the infiltrating resin,
   wherein the yarn contains 2.8 to 25 wt.% of the infiltrating resin relative to its total weight,
   wherein the reinforcing fiber filaments are electrochemically pretreated carbon fiber filaments,
   wherein the infiltrating resin contains at least two bisphenol A epichlorohydrin epoxy resins H1 and H2 in the weight ratio H1:H2 of 1.1 to 1.4, H1 having an epoxy value of 1,850 to 2,400 mmol/kg and a molecular weight of 800 to 1,000 g/mol and solid at room temperature, and H2 having an epoxy value of 5,000 to 5,600 mmol/kg and a molecular weight of <700 g/mol and liquid at room temperature,
   wherein the infiltrating resin contains an additional third resin H3, H3 being a bisphenol A epichlorohydrin epoxy resin with an epoxy value of 450 to 650 mmol/kg, and a melting range of 110 to 130° C., and
   wherein the yarn contains a total of 0.5 to 1.7 wt.% of H1 and H2, and 2.3 to 5.5 wt.% of H3, relative to its total weight.

2. Yarn according to claim 1, wherein the yarn contains 3 to 10 wt.% of infiltrating resin relative to its total weight.

3. Yarn according to claim 1, wherein the electrochemically pretreated carbon fiber filaments obtained from precursors of pitch, polyacrylonitrile or viscose.

4. Yarn comprised of reinforcing fiber filaments and a resin, infiltrated into the yarn, that can be repeatedly melted and solidified by cooling to room temperature,
   wherein the reinforing fiber filaments of the yarn are at least partially bound to one another by the infiltrating resin,
   wherein the yarn contains 2.5 to 2.5 wt.% of the infiltrating resin relative to its total weight,
   wherein the reinforcing fiber filaments are electrochemically pretreated carbon fiber filaments,
   wherein the infiltrating resin contains at least two bisphenol A epichlorohydrin epoxy resins H1 and H2 in the weight ratio H1:H2 of 1.1 to 1.4, H1 having an epoxy value of 1,850 to 2,400 mmol/kg and a molecular weight of 800 to 1,000 g/mol and solid at room temperature, and H2 having an epoxy value of 5,000 to 5,600 mmol/kg and a molecular weight of <700 g/mol and liquid at room temperature,
   wherein the infiltrating resin contains an additional third resin H3, H3 being a bisphenol A epichlorohydrin epoxy resin with an epoxy value of 450 to 650 mmol/kg, and a melting range of 110 to 130° C., and wherein the yarn contains a total of 0.5 to 1.7 wt.% of H1 and H2, and 2.3 to 5.5 wt.% of H3, relative to its total weight, and wherein the yarn is capable of being wound on, and unwound from, a bobbin.

5. Preform comprising yarns according to claim 1, wherein the yarns are bound to one another by the infiltrating resin at points of mutual contact.

6. Preform according to claim 5, wherein the yarns are positioned unidirectionally.

7. Preform according to claim 5, wherein the yarns are positioned bi-, tri- or multidirectionally.

8. Preform according to claim 5, wherein the yarns are present as short yarns.

9. A method of producing a composite comprising a matrix selected from the group consisting of polymers, metals, ceramics, hydraulically setting materials, and carbon, comprising processing the preform of claim 5 with the matrix.

10. Method for producing a preform wherein yarns are bound to one another by an infiltrating resin at points of mutual contact, comprising:
a) providing a yarn according to claim 1,
b) positioning the yarn in a configuration corresponding to a configuration of the desired preform,
c) heating the configuration resulting from step b) to a temperature above the melting temperature of the resin infiltrated in the yarn, and
d) cooling the configuration resulting from step c) to at least below the melting temperature of the resin.

11. Method according to claim 10, wherein the configuration resulting from step b) is compacted simultaneously with the heating in step c).

12. A method of producing a composite comprising a matrix selected from the group consisting of polymers, metals, ceramics, hydraulically setting materials and carbon, comprising processing the preform produced in the method of claim 10 with the matrix.

* * * * *

UNITED STATES PATENT AND TRADEMARK OFFICE
CERTIFICATE OF CORRECTION

PATENT NO. : 8,273,454 B2
APPLICATION NO. : 11/547008
DATED : September 25, 2012
INVENTOR(S) : Markus Schneider et al.

It is certified that error appears in the above-identified patent and that said Letters Patent is hereby corrected as shown below:

Column 6, line 45, "is," should be --is--.

Column 8, Claim 4, line 49, "reinforing" should be --reinforcing--.

Column 8, Claim 4, line 52, "to 2.5 wt.%," should be --to 25 wt.%--.

Column 8, Claim 4, line 67, "and" should be omitted.

Signed and Sealed this
Twelfth Day of February, 2013

Teresa Stanek Rea
*Acting Director of the United States Patent and Trademark Office*